(12) United States Patent
Schut

(10) Patent No.: US 6,558,459 B2
(45) Date of Patent: May 6, 2003

(54) DERIVATIZATION OF DYES/PIGMENTS WITH CROWN ETHERS AND INKJET PRINTING FLUIDS CONTAINING THE SAME

(75) Inventor: David M. Schut, Philomath, OR (US)

(73) Assignee: Hewlett-Packard Development Company, Palo Alto, CA (US)

( * ) Notice: Subject to any disclaimer, the term of this patent is extended or adjusted under 35 U.S.C. 154(b) by 159 days.

(21) Appl. No.: 09/795,341

(22) Filed: Feb. 27, 2001

(65) Prior Publication Data

US 2002/0144626 A1 Oct. 10, 2002

(51) Int. Cl.[7] .............................................. C09D 11/02
(52) U.S. Cl. ............................... 106/31.58; 106/31.49; 106/31.51; 106/31.52; 106/31.86
(58) Field of Search ........................... 106/31.58, 31.86, 106/31.51, 31.52, 31.49

(56) References Cited

U.S. PATENT DOCUMENTS

| | | | |
|---|---|---|---|
| 2,833,736 A | 5/1958 | Glaser et al. ................. 524/557 |
| 3,607,813 A | 9/1971 | Purcell et al. ............... 260/29.6 |
| 4,104,061 A | 8/1978 | Roberts ........................ 75/211 |
| 4,770,706 A | 9/1988 | Pietsch ..................... 106/31.83 |
| 4,790,880 A | 12/1988 | Miller ...................... 106/31.46 |
| 4,838,938 A | * 6/1989 | Tomida et al. ............ 106/31.38 |
| 4,990,185 A | * 2/1991 | Krishnan .................. 106/31.86 |
| 5,026,755 A | 6/1991 | Kveglis et al. .............. 524/389 |
| 5,085,698 A | 2/1992 | Ma et al. ..................... 524/388 |
| 5,134,232 A | 7/1992 | Tsien et al. ................. 540/467 |
| 5,181,045 A | 1/1993 | Shields et al. ............... 346/1.1 |
| 5,428,383 A | 6/1995 | Shields et al. ................ 347/96 |
| 5,516,864 A | 5/1996 | Kuhn et al. .................. 526/263 |
| 5,554,739 A | 9/1996 | Bellmont .................... 534/885 |
| 5,555,008 A | 9/1996 | Stoffel et al. ................ 347/100 |
| 5,571,311 A | 11/1996 | Belmont et al. .......... 106/31.28 |
| 5,609,671 A | 3/1997 | Nagasawa ................. 106/31.65 |
| 5,630,868 A | 5/1997 | Belmont et al. ......... 106/31.75 |
| 5,679,143 A | 10/1997 | Looman ................... 106/31.43 |
| 5,707,432 A | 1/1998 | Adams et al. .............. 106/31.6 |
| 5,718,746 A | 2/1998 | Nagasawa et al. ......... 106/31.9 |
| 5,722,745 A | 3/1998 | Courtemanche et al. ..... 305/168 |
| 5,749,952 A | 5/1998 | Tsang et al. .............. 106/31.64 |
| 5,785,743 A | 7/1998 | Adamic et al. .......... 106/31.27 |
| 5,785,745 A | * 7/1998 | Lauw et al. .............. 106/31.27 |
| 5,837,045 A | 11/1998 | Johnson et al. .......... 106/31.85 |
| 5,846,307 A | 12/1998 | Nagasawa et al. ....... 106/31.75 |
| 5,853,465 A | 12/1998 | Tsang et al. .............. 106/31.25 |
| 5,861,447 A | 1/1999 | Nagasawa et al. .......... 523/161 |
| 5,864,994 A | 2/1999 | Graf et al. .................. 52/171.3 |
| 5,865,994 A | 2/1999 | Riviello et al. .......... 210/198.2 |
| 5,886,065 A | 3/1999 | Tsang et al. ................. 523/161 |
| 5,891,956 A | 4/1999 | Smith et al. .................... 525/56 |
| 5,935,309 A | * 8/1999 | Moffatt et al. ............ 106/31.27 |
| 6,099,632 A | 8/2000 | Nagasawa et al. ......... 106/31.9 |

FOREIGN PATENT DOCUMENTS

| | | | |
|---|---|---|---|
| EP | 0733682 | 9/1996 | ........... C09D/11/00 |
| EP | 0778325 | 6/1997 | ........... C09D/11/16 |
| EP | 0802247 | 10/1997 | ........... C09D/11/00 |
| EP | 0819737 | 1/1998 | ........... C09D/11/00 |
| EP | 0688836 | 9/1999 | ........... C09D/11/02 |

* cited by examiner

*Primary Examiner*—Helene Klemanski

(57) ABSTRACT

An inkjet ink is provided that employs one or more water-soluble colorants or water-insoluble colorants, such as solvent dyes, disperse dyes, or pigments. The colorant, whether water-soluble or water-insoluble, is derivatized with one or more crown ethers to render the water-insoluble colorants soluble in water and in water-miscible organic solvents commonly employed in inkjet printing, particularly thermal inkjet printing, and to impart improved properties to the colorants, such as lightfastness, smearfastness, and waterfastness. The inkjet ink comprises a vehicle and at least one crown ether derivatized colorant. The resulting inkjet ink evidences improved print quality properties, compared to inkjet inks containing colorants that are not so derivatized.

34 Claims, No Drawings

DERIVATIZATION OF DYES/PIGMENTS WITH CROWN ETHERS AND INKJET PRINTING FLUIDS CONTAINING THE SAME

FIELD OF THE INVENTION

The present invention is related generally to inkjet inks used in inkjet printing, and, more particularly, to the generation of a colorant set derivatized with crown ethers that promote water solubility of the colorant, increase the interaction of the colorant with the media to produce greater durability, and to interact with a reactive fluid to produce insoluble colorants on the media.

BACKGROUND ART

There have been many different approaches and attempts to improve lightfastness, smearfastness, smudgefastness and waterfastness in inkjet printing fluids. Some of these approaches include:

Use of Acid-Based Underprinting Fluids: This approach immobilizes dyes based upon their pKa using standard acid/base chemistry. The problem with this approach is that the use of acids can affect the lightfastness of the printed material as well as degrade the media upon which the print is placed. Examples of such an approach are taught in, e.g., U.S. Pat. Nos. 5,181,045; 5,785,743; and 5,679,143.

Use of Cationic Salts in Underprinting Fluids: This approach immobilizes dyes by creating insoluble salts of calcium, magnesium and/or aluminum. Problems associated with this approach include: decrease in the chroma of the printed material due to aggregation of the dyes—requiring much more ink to be placed on the media in order to generate the required chroma, and change in the hue and color characteristics of the dye due to aggregation. An example of such an approach is taught in, e.g., U.S. Pat. No. 5,428,383.

Use of Pigmented Inks: This approach leads to inks which have tremendous properties in all desired areas, that is, lightfastness, waterfastness, and smearfastness. However, with smaller drop volumes, these inks have problems generating the appropriate chroma needed for the marketplace, especially with fast printing applications. Furthermore, stability of the inks tends to be a problem, with pigments aggregating with themselves to generate larger particle sizes.

Although there are no examples of using dyes or pigments for inkjet printers containing crown ethers covalently bound to them, there are several pertinent references that apply to the idea on which the present invention is based:

U.S. Pat. No. 5,516,864 details the synthesis of novel sensors for ions that are based upon the combination of xanthylium-based dyes with N,N'-diaryldiaza crown ethers which fluoresce in the presence of certain ions. It is used as a sensor.

U.S. Pat. No. 5,134,232 describes the synthesis of novel sensors for ions that are based upon the combination of fluorescent chelator compounds to be used as biochemical sensors for ions.

U.S. Pat. No. 5,891,956 depicts the use of crown ethers for the solubilization of polymers and their subsequent use for the chelation of ions.

U.S. Pat. No. 5,865,994 describes the synthesis of bifunctional crown ethers for the purpose of selectively binding cations for use in quantitative detection of such cations and their separation from similar cations through the use of HPLC (high performance liquid chromatography).

Finally, U.S. Pat. No. 4,790,880 discusses the use of crown ethers used in inkjet inks to form complexes with cations associated with anionic dyes; the ink composition evidences reduced crusting, increased fade resistance, and reduced kogation in thermal inkjet printers.

There remains a need for inkjet inks having improved lightfastness, smearfastness, smudgefastness and waterfastness that employ water-soluble colorants that interact with the media and/or with a reactive fluid to generate durable print images.

DISCLOSURE OF INVENTION

In accordance with the present invention, an inkjet ink is provided that employs one or more colorants which are derivatized with one or more crown ethers to render a colorant soluble in water and in water-miscible organic solvents commonly employed in inkjet printing, particularly thermal inkjet printing.

The inkjet ink comprises a vehicle and at least one crown ether derivatized colorant. The colorant may comprise one or more water-soluble or water-insoluble dyes or pigments.

Also in accordance with the present invention, a method of rendering a water-insoluble colorant soluble in an aqueous environment, comprises:

providing a water-insoluble colorant selected from the group consisting of insoluble dyes and pigments; and reacting the water-insoluble colorant with at least one crown ether.

Further in accordance with the present invention, a method of forming an inkjet ink comprising a vehicle and a water-soluble colorant selected from the group of crown ether derivatized dyes and pigments is provided. The vehicle comprises water and at least one water-miscible organic solvent. The method comprises:

providing a water solublized colorant selected from the group of reactive dyes and/or pigments which have been derivatized with one or more crown ethers; and adding the crown ether derivatized colorant to the vehicle to form the inkjet ink.

The resulting inkjet ink evidences improved lightfastness, smearfastness, smudgefastness and waterfastness, compared to inkjet inks containing water soluble colorants that are not so derivatized.

DETAILED DESCRIPTION OF THE INVENTION

Definitions

Reactant Fluid: also known as a fixer fluid. A fluid that is typically substantially devoid of color (i.e., the reactant fluid may contain no colorant (e.g., dye or pigment), or it may contain a colorant that does not absorb visible light but may absorb in either or both the IR or UV spectrums). The reactant fluid comprises a component (a molecule or complex, or a functional group in a molecule or complex) that is reactive with a component (a molecule or complex, or a functional group in a molecule or complex), including the colorant, in an ink thus providing for enhanced image integrity of printed areas created with the ink; such as increased waterfastness, smearfastness, smudgefastness or bleed alleviation; improved color vibrancy, improved edge acuity, or reduced dry time; in the event that the reactant fluid and the ink are printed at least partially on a same pre-determined area on a print medium, or on predetermined areas adjacent one another on a print medium. The reactive fluid is reactive with at least one ink formulated according to the present invention.

Ink: a fluid containing at least one colorant, the ink absorbing in one or more regions (e.g., visible, IR, UV, etc.). Inkjet printers typically contain an ink set with black, magenta, cyan and yellow inks—commonly known as a 4-pen ink set. Additional pens with additional color inks may also be present, either a different color than the four listed above, or the same color, but different intensity.

Derivatization of Colorants

In addition to the derivatization of various water-soluble dyes, derivatization of solvent dyes, disperse dyes and/or pigments with crown ethers gives the water-solubility properties that are needed for inkjet applications. By themselves, these latter dyes and pigments are insoluble in aqueous systems and must use either dispersants to solubilize themselves and/or organic solvents. The first solution (dispersants) leads to situations where the ink may become unstable for storage purposes and lead to increased dry times where traditional methods for ink drying will not work due to this destabilization of the ink, whereas the latter solution (organic solvents) leads to situations where the solvent may then start attacking the pen material, causing degradation of the pen body, cause destabilization of pigmented inks and decreasing the useful lifetime of the pen.

By derivatizing these dyes and pigments so that they are water-soluble, the lightfastness issue is addressed as well. Pigments have inherently better lightfastness than water-soluble dyes, while disperse and solvent dyes exhibit remarkable lightfastness which exceeds many of those commonly used in the inkjet marketplace. Also, because pH drifts in the ink may cause interaction of acid with the sulfonic or carboxylic groups on traditional dyes, precipitation of the dye may take place. The crown ether derivatized dyes will not interact in such a manner, and the reliability of the resultant inks is increased since these will be neutral molecules.

The problem of chroma loss when using crown ether derivatized dyes does not occur because one metal cation interacts with one dye molecule, eliminating any aggregation effects that may occur. Additionally, because the metal interacts with the crown ether portion of the molecule, there is no interaction with the chromophore of the dye, hence, no hue changes or loss of chroma due to these interactions.

Finally, use of dyes over use of pigments has its advantages when going to smaller drop size and when looking at the amount of material that needs to be printed since pigments typically have lower chroma values than dyes. However, use of self-dispersing pigments may be examined by derivatizing the pigment with the crown ether. This would eliminate the use of unstable inks which need dispersants in order to "solubilize" the pigment.

Examples of self-dispersing pigments are disclosed in a number of patents assigned to Cabot Corp. (preparation and use in inkjet inks) and include U.S. Pat. Nos. 5,085,698; 5,555,008; 5,554,739; 5,571,311; 5,630,868; 5,707,432; 5,837,045. Note also the following patents assigned to Orient Chemical: EP 0688836; EP 0733682; U.S. Pat. No. 5,609,671; EP 0778325; EP 0802247; EP 0819737; U.S. Pat. Nos. 5,718,746; 5,846,307; 5,861,447; and 6,099,632. Finally, relevant patents assigned to the same assignor as the present application include: U.S. Pat. Nos. 5,749,952; 5,853,465; and 5,886,065.

By increasing the size of the dye (through incorporation of the crown ether) and by introducing non-reactive oxygens into the molecule for both pigments and dyes, the water-fastness and smearfastness properties of the ink should increase due to increased interaction of the dye and/or pigment with the printed media. Hydrogen bonds of the cellulose based media (paper) should form from the hydroxyl groups of the cellulose to the oxygen atoms of the crown ether, as shown below.

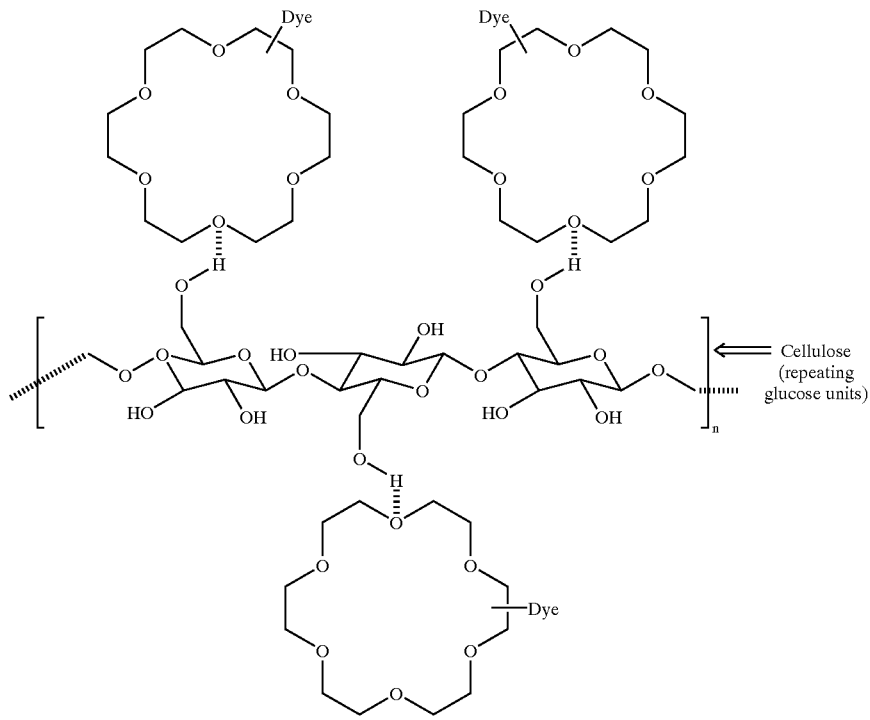

Finally, incorporation of a reactive fluid that is applied onto the media underneath or on top of the ink itself, can contain cations or other materials that may be used to "fix" the crown ether derivatized dye into place, providing even greater durability—especially towards waterfastness.

Advantages of Invention Over Previous Solutions:

Because there are no acid groups on the dyes which have been derivatized from water-insoluble dyes, there will be little interaction of the dye with the surface of the resistor. Kogation can occur for several reasons, but one of those reasons is because of solubility problems of the dye in the presence of organic acids and or cationic salts which are used for bleed control purposes. The insolubility of the dye causes it to crash out directly onto the surface of the resistor (migration of the dye due to higher temperatures and increased solubility) where it is then "baked" by the high temperatures of the resistor surface. Incorporation of crown ethers onto a dye or pigment would eliminate this problem since it will not interact with acids or precipitate out with cationic salts.

If the crown ether is chosen correctly, responsiveness to a specific countercation can be achieved. For instance, 12-crown-4 derivatives will interact preferentially with $Li^+$ ions, 18-crown-6 derivatives with $Ca^{2+}$ ions, and so forth.

The types of crown ethers (including aza-crowns and thio-crowns that may be used in the practice of the present invention include those shown below.

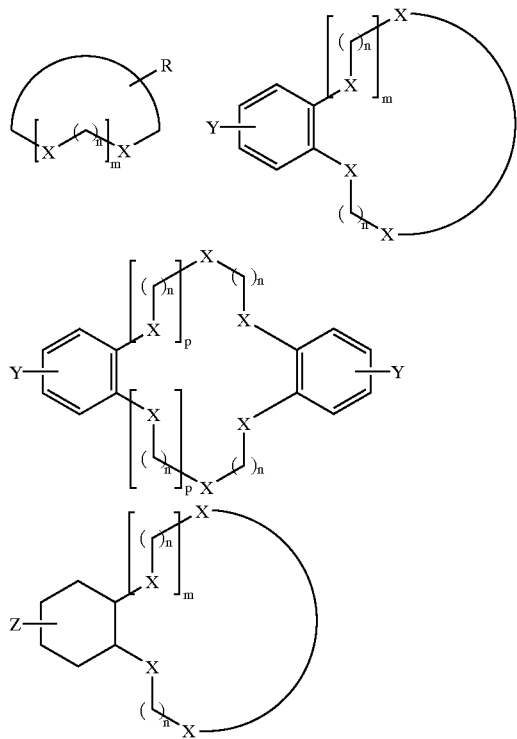

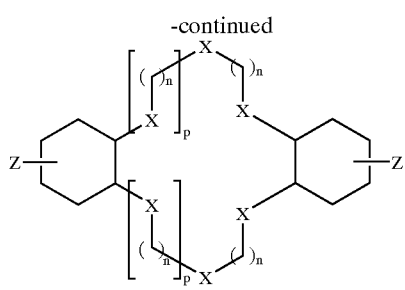

where:
X=O, S, NH and/or NR';
R=any reactive group through which the crown ether may be attached covalently onto the ring (examples include: —(C=O)R', —Cl, 'Br, 'NH$_2$, —OH, —CH$_2$NH$_2$, —CH$_2$OH, —CH=CH$_2$, etc.);
R'=any aliphatic group or aromatic group (additionally, salts of the amine may also be made through protonation with the appropriate acid);
n=2 to 3;
m=3 to 10;
p=to 5;
Y=aromatic functionality (phenyl, naphthyl, etc.) with a reactive group attached through which the crown ether may be covalently bound to the dye molecule (see R); and
Z=cyclic aliphatic functionality (cyclohexane, cycloheptane, cyclopentane, etc.) with a reactive group attached through which the crown ether may be covalently bound to the dye molecule (see R).

Open-chain polyethers, cryptands, poly(crown ethers) and all nitrogen-containing macroheterocycles are included to the extent that they behave as crown ethers. The preparation and properties of macrocyclic polyethers are described in U.S. Pat. No. 3,562,295.

The stability of crown ether-cation complexes depends on several factors: these include cavity size of the ligand, cation diameters, spatial distribution of ring binding sites, the character of the heteroatoms, the presence of additional binding sites and the type of solvent used. In aprotic solvents, the stability also depends on the nature of the anion.

Another advantage to these types of dyes and/or self-dispersing pigments is the type of solvent system that may be used. Although the present invention will deal exclusively with the use of these dyes and/or pigments in aqueous solutions for thermal inkjet applications, these dyes will still be soluble in other solvents for other applications (i.e.; piezo-electric inkjet applications, electrospray applications, etc.).

Description of Invention:

The idea behind the present invention is very straightforward: derivatization of water soluble dyes, water-insoluble dyes and/or pigments with crown ethers to make materials that are water-soluble, have better lightfastness (through the inherent properties of the dyes and pigments compared to previously water-solubilized dyes), better stability for pigments (no need for dispersants), increased waterfastness, smudgefastness and smearfastness (through increased interaction with the media through hydrogen bonding), better fixing capabilities (better interaction with an underprinting fluid) and kogation resistance from metal ion contamination.

The synthesis of these dyes uses conventional synthetic organic chemistry techniques and several methods for the derivatization of such material will now be described.

The crown ethers mentioned are commercially available and are available from such companies as: Aldrich Chemical Company (Milwaukee, Wis.); Spectrum Chemical Manufacturing (New Brunswick, N.J.), Acros Organics (Pittsburgh, Pa.), and IBC Advanced Technologies (American Fork, Utah).

Method of Synthesis:

The dyes and pigments of the present invention may be synthesized using the general procedures and conditions described below in the various Examples and in U.S. Pat. No. 5,722,745.

Example #1: Derivatization of Reactive Dye

The synthesis of crown ether derivatized dyes using triazinyl reactive dyes may be conducted by several methods as shown in Reaction Schemes 1–4.

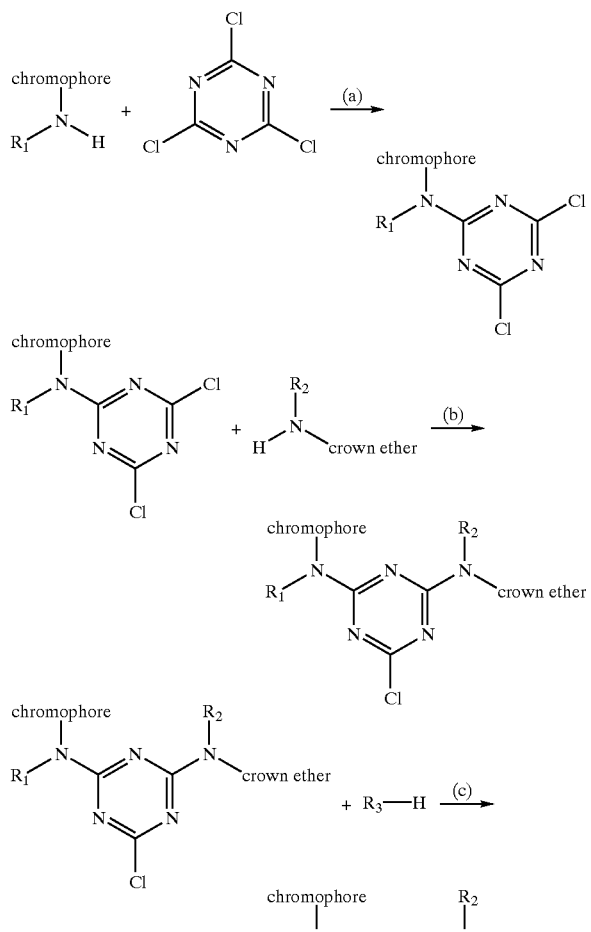

Reaction Scheme 2

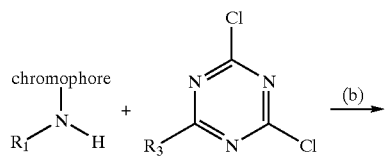

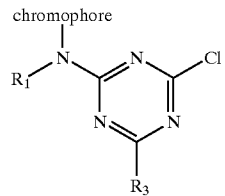

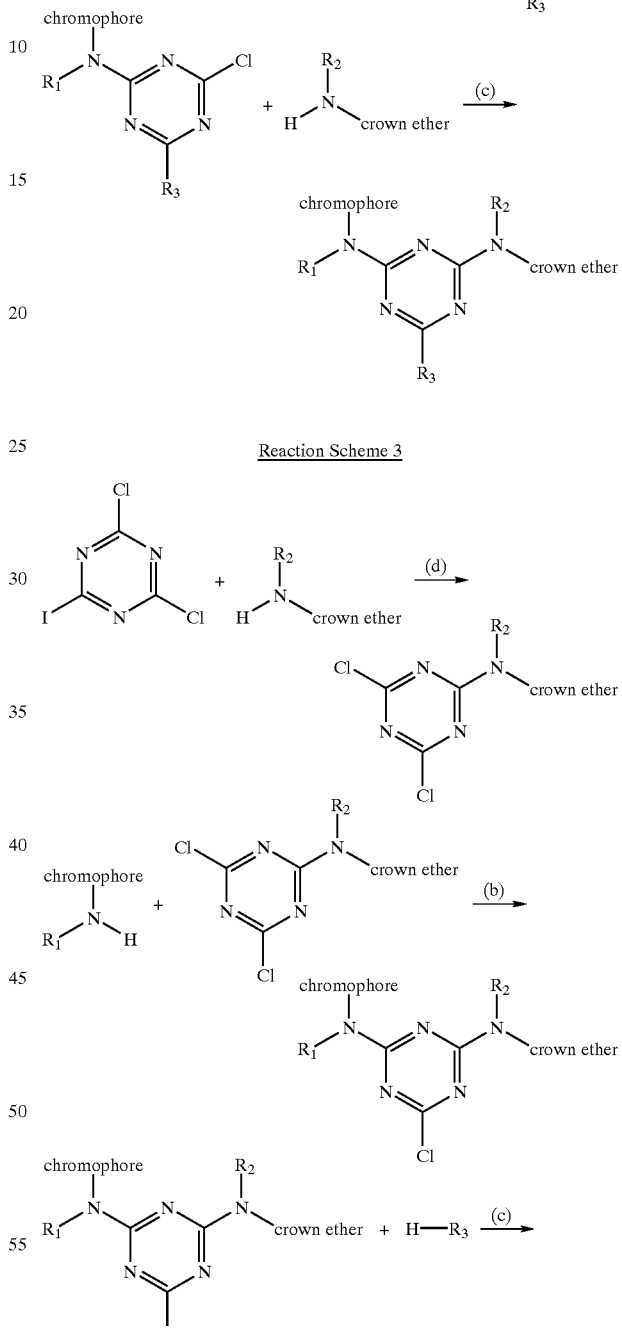

Reaction Scheme 3

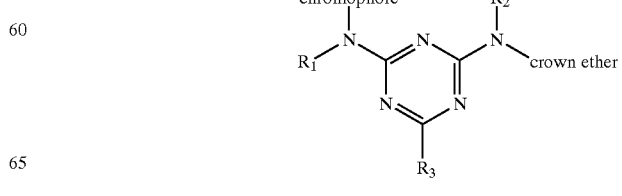

Reaction Scheme 4

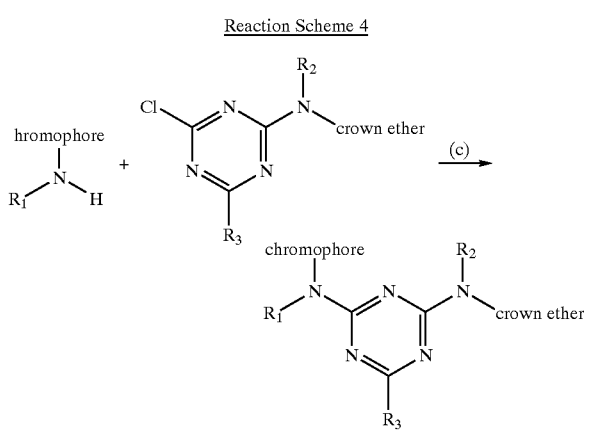

The following exemplify the typical reaction conditions designated as (a), (b), (c), or (d) in Reaction Schemes 1–4:

Reaction (a): Dissolve dye/chromophore in water at neutral pH (pH~7) and add to an ice cold suspension of cyanuric chloride (ice bath made up from 1:1 acetone:ice water) at a dye/chromophore to cyanuric chloride molar ratio of about 1:1. Stir the reaction mixture for about 2 hours. The reaction product may then be isolated through precipitation methods, rinsing with hexanes and followed by drying the precipitate.

Reaction (b): Dissolve the dichlorotriazinyl compound in water at neutral pH (pH~7) and add a one molar equivalent of the reactive material which has been dissolved in water at pH~7. Raise the temperature to 35° C. and allow reaction to proceed overnight. The reaction product may then be isolated through precipitation methods, rinsing with hexanes and drying. If the reactive material is the amino functionalized crown ether and $R_3$ is also an amino functionalized crown ether, then this reaction may be run at 70° to 75° C. for 6 hours before isolating the final product.

Conversely, an alternate procedure may be used to selectively generate the mono-crown ether substituted compound when using a dichlorotriazinyl substituted dye as the starting material. Into the reaction vessel, suspend the dichlorotriazinyl compound, 1 molar equivalent of the amino functionalized crown ether (an excess may be used with this process since only one equivalent will be placed on the triazo ring), and 1 molar equivalent of $NaHCO_3$ (sodium bicarbonate) in acetonitrile ($CH_3CN$). Allow the reaction to reflux for about 3 days, at which time the product may be isolated by removing the solvent and purifying the product through column chromatography using silica gel and acetonitrile/water as the eluent.

Reaction (c): Dissolve the monochlorotriazinyl compound in water along with the reaction material. Dissolve two molar equivalents of $NaHCO_3$ (sodium bicarbonate) in the reaction solution. Raise the temperature to about 70° to 75° C. and maintain this temperature for about 6 hours. Isolate the final product through precipitation methods and rinsing with hexanes and drying.

Reaction (d): Dissolve the amino functionalized crown ether in water at neutral pH (pH~7). Add to an ice cold suspension of cyanuric chloride (ice bath made up from 1:1 acetone: ice water) at a molar ratio of 1:1. Stir the reaction mixture for 2 hours before proceeding to the next step of the synthesis.

In the above-described Reaction Schemes 1–4:

$R_1$ is H or $C_1$–$C_5$, preferably H or $CH_3$, and more preferably H;

$R_2$ is H or $C_1$–$C_5$, preferably H or $CH_3$, and more preferably H;

$R_3$ is selected from the group consisting of —OH, $R_4CO_2H$ wherein $R_4$ is an aromatic or aliphatic moiety substituted with a $CO_2H$ group, $R_5SO_3H$ wherein $R_5$ is an aromatic or aliphatic moiety substituted with an —$SO_3H$ group, $NR_1R_6$ wherein $R_6$ is an aromatic moiety, —C≡N, —Cl, D, wherein D is a chromophore, and $NR_2R_7$ wherein $R_2$ is defined above and $R_7$ is defined as a crown ether.

Again, it must be emphasized that the size of the crown ether can be varied and would be dependent upon the size of the countercation used to help "fix" the dye molecule.

Example #2: Derivatization of Dye Containing Primary or Secondary Amine

A crown ether, containing a primary or secondary halogen (Br or I can be used in place of Cl, n=1–6 aliphatic chain, or may even consist of an aromatic substituent or other substituent to give other desired physical properties to the molecule), is reacted with a chromophore which has a primary or secondary amine group. This dye may then undergo the reactions as provided in Reaction Scheme 5.

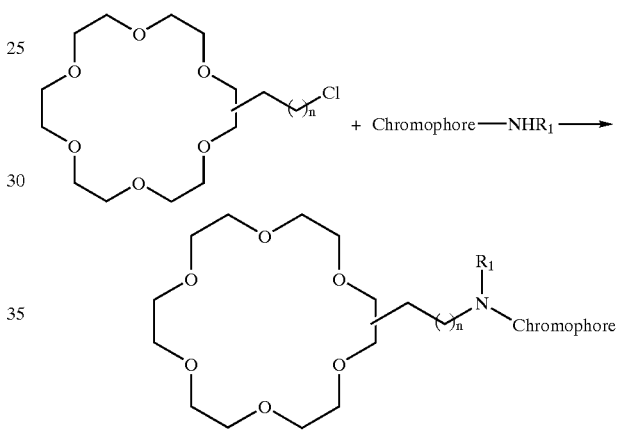

Reaction (e): Dissolve one molar equivalent of the starting dye in a polar, aprotic solvent (acetonitrile, dimethylformamide, etc.) with one molar equivalent of the crown ether. Reflux the mixture while stirring vigorously overnight. At the end of this time, the dye may be purified through precipitation techniques and dried thoroughly by rinsing with hexanes.

An alternate pathway to derivatizing these types of dyes is given in the following schematic (using Reaction Scheme 6):

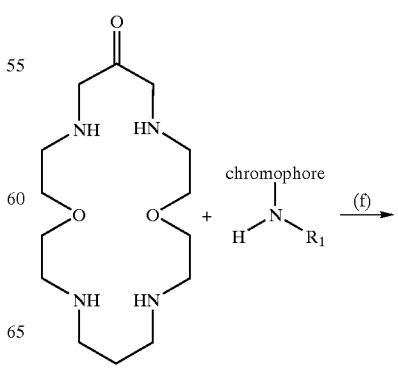

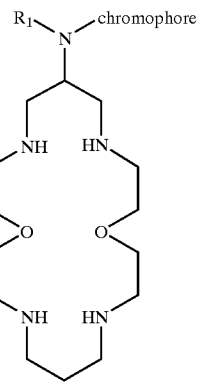

Reaction (f): Dissolve one molar equivalent of the starting dye in deionized water (or for those insoluble dyes—tetrahydrofuran) with one molar equivalent of the crown ether using a well-ventilated heating apparatus. Add 2 molar equivalents of hydrochloric acid to the reaction mixture and stir vigorously. Slowly add a molar equivalent of sodium cyanoborohydride (dissolved in methanol) to the reaction mixture. After addition of the sodium cyanoborohydride, slowly warm the reaction mixture to reflux and continue refluxing for a period of 4 to 8 hours. At the end of the reflux period, cool the reaction to room temperature, add enough hydrochloric acid to evolve hydrogen cyanide from the excess sodium cyanoborohydride. Concentrate the reaction mixture using reduced pressure and purify with the use of a silica gel column using acetonitrile and water as the eluent—or use precipitation methods followed with washing by hexanes to dry the material.

Example #3: Friedel-Crafts Alkylation

In this example, a highly aromatic pigment and/or dye undergoes the Friedel-Crafts alkylation for multiple substitutions of crown ethers. If this reaction is to be controlled, a Friedel-Crafts acylation may take place in which the halogenated crown ether is replaced by a acylhalide substituted crown ether. Because of the electron withdrawing ability of the carbonyl group, the extent of substitution is much more reduced by using the acylhalides. Conditions for this reaction are given under Reaction Scheme 7.

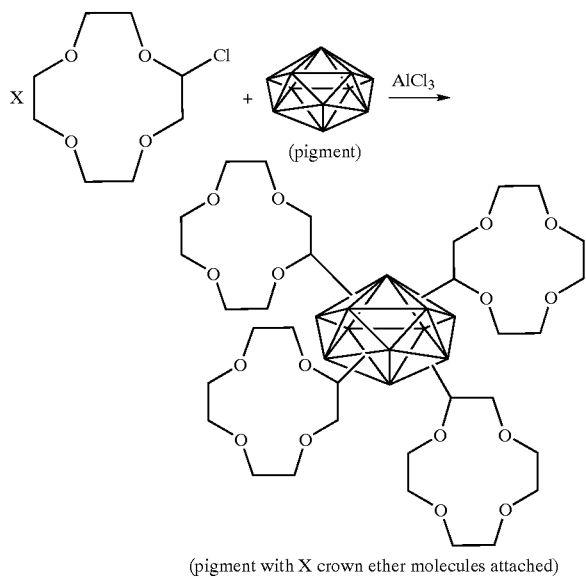

(pigment with X crown ether molecules attached)

Reaction (g): In a well-ventilated heating apparatus, place 2.0 g. of aluminum chloride ($AlCl_3$) in about 50 mL of methylene chloride ($CH_2Cl_2$) and begin stirring. Slowly add the halogenated crown ether to this solution. When an excess of halogenated crown ether has been used (use a 2× to 5×wt % to pigment ratio for the crown ether), slowly add a suspension of the pigment (suspended in methylene chloride) to the reaction mixture. After complete addition of the pigment, continue stirring for 1 to 2 hours before isolating the pigment through traditional purification methods.

There are, of course, many other reactions that may be used to substituted a crown ether on those molecules and the present invention is not limited to those mentioned above.

The ratio of dye molecule to crown ether molecule will, in general, be about 1:1, although there may be some excess of the crown ether to ensure essentially complete reaction. With regard to pigments, the ratio of pigment to crown ether molecule must be determined for each pigment and crown ether molecule combination. Essentially, sufficient crown ether must be reacted with the pigment to solubilize the pigment. Based on the teachings herein, such determination is not considered undue, and is within the competence of the person skilled in this art.

Even though the waterfastness and smearfastness of the printed material should be improved with respect to interaction of the substituted dye and/or pigment with the hydroxyl groups of the cellulose, this can be improved greatly through the use of underprinting and/or overprinting material which can act as a binding or fixing reagent. Methods of underprinting are now discussed.

Method #1:

A reactive fluid made up of cationic surfactants and either containing large concentrations of cationic salts (dependent upon the type of crown ether used) and/or cationic polymers such as polyethyleneimine will be laid down prior to the ink containing anionic surfactants and/or other binder materials such as styrene-maleic anhydride which has been hydrolyzed to the corresponding dibasic anion. In this manner, a gel should form through the interaction of the cationic surfactant and/or cationic polymer with the anionic surfactant or binder material to slow down the penetration of the dye and allow the crown ethers to interact with the cationic salt and with the media much more effectively. The idea that coordination of the cationic salt by the crown ether slows the rate of penetration of the dye into the media—providing richer color and allowing more interaction of the dye with the media.

Examples of such cationic salts include $Ca(NO_3)_2$, $CaCl_2$, $Mg(NO_3)_2$, $LiNO_3$, $NaNO_3$, $NaCl$, $LiCl$, $KCl$, $KNO_3$, $MgCl_2$, $AlCl_3$ and $Al(NO_3)_3$.

Method #2:

Use of a reactive fluid made up of anionic surfactants and/or binders (as described above in Method #1), and the use of an ink containing cationic surfactants and cationic salts already bound by the crown ether substituted dye/pigment, is another possibility. Again, as in Method #1, gelation of the printed material should occur through the interaction of the anionic surfactants and/or binders with the cationic surfactants. The gelation itself should slow the rate of penetration of the dye into the media. With coordination of cationic salts by the crown ethers, a competition for these cations would result as well as coordination of the anionic surfactant to the bound cation—thus increasing the effective size of the dye, which would slow the penetration of the dye even further.

Inkjet Ink Composition

The inkjet inks of the present invention comprise a vehicle and at least one colorant derivatized with at least one crown ether.

All concentrations herein are expressed in weight percentages, unless otherwise indicated. The purity of all components is that employed in normal commercial practice for inkjet inks. All cited documents and patents are hereby incorporated by reference.

Other ingredients added to the inks of this invention should be compatible with the above colorants employed in this invention. Likewise, other ingredients added to the reaction fluids of this invention should be compatible with the above reactive agents employed in this invention.

The aqueous vehicle is water or a mixture of water and at least one water-soluble organic co-solvent, as is well-known in the art. Selection of a suitable mixture depends on requirements of the specific application, such as the desired surface tension and viscosity, the selected colorant or reactive agent, drying time of the inkjet fluid, and the type of print medium onto which the fluid will be printed. For a discussion of inks and their properties, see U.S. Pat. Nos. 2,833,736; 3,607,813; 4,104,061; 4,770,706; and 5,026,755.

The co-solvents employed in the inkjet inks of the present invention comprise one or more organic, water-miscible solvents commonly employed in inkjet printing. These are employed to act as anti-cockle reagents and as humectants. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, polypropylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidinone, 1,5-pentanediol, 2-pyrrolidinone, diethylene glycol, 1,3-(2-methyl) propanediol, 1,3,5-(2-methyl)-pentanetriol, tetramethylene sulfone, 3-methoxy-3methylbutanol, glycerol, and 1,2-alkyldiols.

Additives, such as surfactants, biocides, pH adjusters, and the like may be added as appropriate. Suitable surfactants that may be used can be nonionic, cationic and/or anionic in both the fixer fluid and in the ink vehicle fluid. Examples of suitable nonionic surfactants include, secondary alcohol ethoxylates (e.g., Tergitol series available from Union Carbide Co.), nonionic fluoro surfactants (such as FC-170C available from 3M), nonionic fatty acid ethoxylate surfactants (e.g., Alkamul PSMO-20 available from Rhone-Poulenc), and acetylenic polyethylene oxide surfactants (e.g., Surfynol series, available from Air Products % Chemicals, Inc.). Examples of anionic surfactants include alkyldiphenyloxide surfactants (such as Calfax available from Pilot), and Dowfax (e.g., Dowfax 8390 available from Dow), and fluorinated surfactants (Fluorad series available from 3M). Cationic surfactant examples include betaine type surfactants (e.g., Hartofol CB-45 available from Hart Product Corp., Mackam OCT-50 available from McIntyre Group Ltd., Amisoft series available from Ajinomoto), quaternary ammonium compounds (e.g., Glucquat series available from Amerchol, Bardac and Barquat series available from Rhone-Poulenc, Barlox series available from Lonza) and imidazoline surfactants (e.g., Miramine series available from Rhone-Poulenc, Unamine series available from Lonza).

Buffers may be used to modulate pH and they can be organic-based biological buffers or inorganic buffers such as sodium phosphate. Furthermore, the buffer employed should provide a pH ranging from about 4 to about 9 in the practice of this invention. Examples of preferably employed organic buffers include Trizma base, available from such companies such as Aldrich Chemical (Milwaukee, Wis.), 4-morpholinoethanesulfonic acid (MES) and 4-morpholinopropanesulfonic acid (MOPS).

Any of the biocides commonly employed in inkjet inks may be employed in the practice of the invention, such as NUOSEPT 95, available from Degussa-Hüls (Piscataway, N.J.); Proxel GXL (available from Avecia (Wilmington, Del.); and glutaraldehyde, available from Union Carbide Company (Bound Brook, N.J.) under the trade designation UCARCIDEW 250. Proxel GXL is the preferred biocide.

Ranges for these co-solvents (humectant/anti-cockle) and additives are given in the following Table I.

TABLE I

Ink Vehicle and Reactive Fluid Compositions (in Wt %)

| Component | Ink Vehicle | | | Reactive Fluid | | |
| --- | --- | --- | --- | --- | --- | --- |
| | Preferred | More Preferred | Most Preferred | Preferred | More Preferred | Most Preferred |
| Colorant | 1 to 10 | 2 to 8 | 3 to 6 | —* | —* | —* |
| Humectant/Anti-Cockle | 1 to 40 | 5 to 40 | 10 to 35 | 1 to 40 | 5 to 40 | 10 to 35 |
| Surfactant | 0 to 40 | 0.5 to 20 | 2 to 5 | 0 to 40 | 0.5 to 20 | 2 to 10 |
| Biocide | 0 to 10 | 0.01 to 5 | 0.01 to 2 | 0 to 10 | 0.01 to 5 | 0.01 to 2 |
| Fixer Component | — | — | — | 0 to 40 | 1 to 20 | 5 to 15 |
| Buffer | 0 to 20 | 0 to 10 | 0 to 5 | 0 to 20 | 0 to 10 | 0 to 5 |
| pH | 4 to 11 | 6 to 10 | 7 to 9 | 2.5 to 11 | 3 to 8 | 4 to 7 |

*Does not imply that no "indicator" or "tracer" dye cannot be used in the system.

Examples of suitable starting dyes include, but are not limited to: acid alizarin brown RP, acid blue 129, acid blue 25, acid blue 29, acid blue 40, acid blue 41, acid yellow 66, acid yellow 69, acid yellow 9, basic blue 16, basic blue 11, basic blue 7, basic orange 2, basic red 2, basic red 5, basic red 9, basic violet 14, basic violet 2, cotton orange G, cresyl violet acetate, direct blue 1, direct blue 71, direct brown 191, Avecia 286/287 (also available under the trade name Projet Black 1/Projet Black 2), disperse black 1, disperse black 2, disperse black 3, and disperse black 4; dichlorotriazinyl dyes such as reactive yellow 3, reactive red 2, reactive red 5, reactive red 4; monochlorotriazinyl dyes, such as reactive yellow 127, reactive red 24, reactive blue 15, reactive violet 2 and reactive black 1.

Non-limiting examples of water soluble magenta, yellow and cyan dyes respectively derivatized according to the present invention are given below:

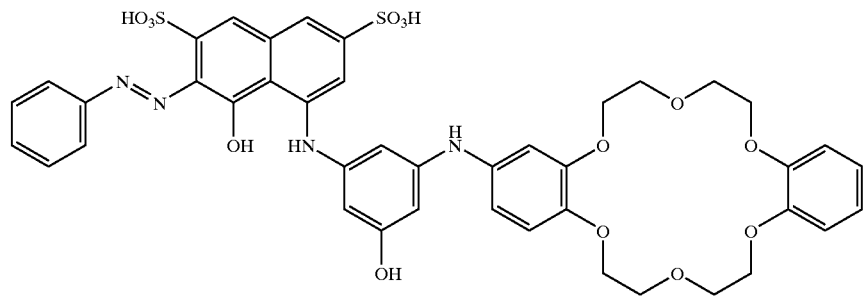

Magenta dye (reactive red 2 derivative)

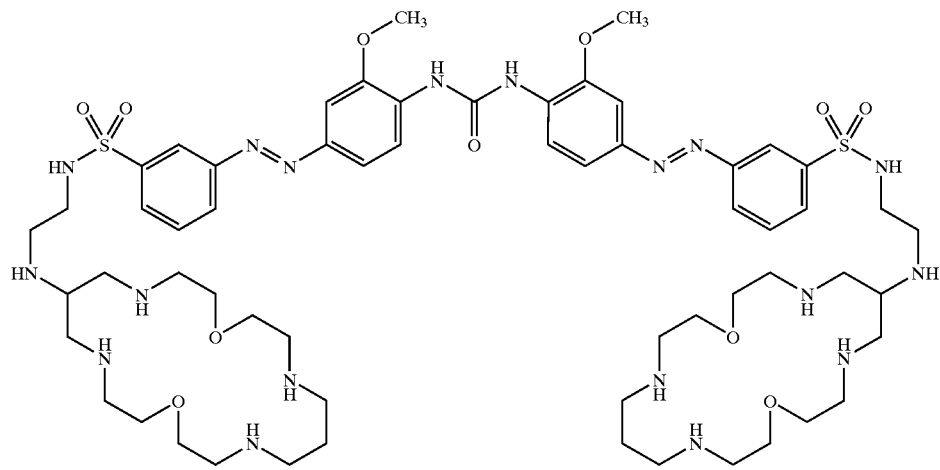

Yellow dye (direct yellow 132 derivative)

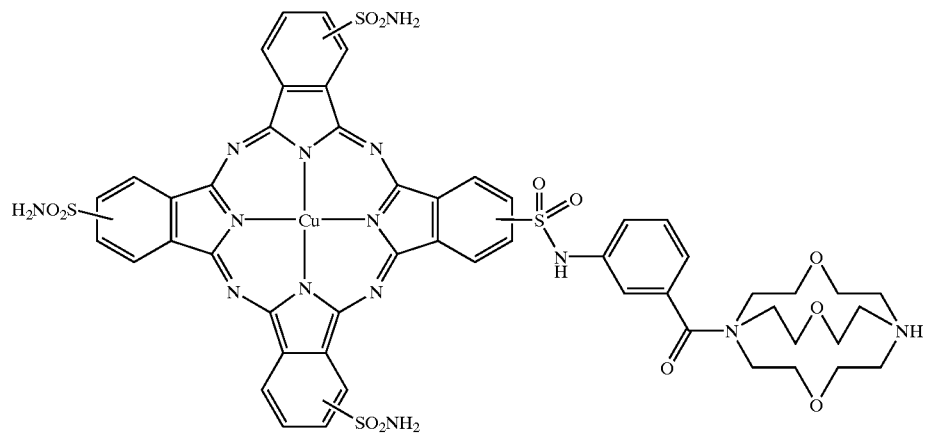

Cyan dye (direct blue 199-derivative)

Examples of suitable starting pigments include, but are not limited to: pigment blue 15:4, pigment red 1, pigment red 100, pigment red 177, pigment red 3, pigment red 4, pigment red 40, pigment red 6, pigment red 93, pigment yellow 10, pigment yellow 60, pigment yellow 7. Carbon black may also be used as a starting material, with many grades available from such companies as Cabot Corporation, Degussa-Huls, and Columbian Chemicals.

The fluids of the present invention may comprise from about 1 to about 40 wt % of at least one organic solvent (humectant/anti-cockle), listed above. More preferably, the fluids comprise from about 5 to about 40 wt % of at least one organic solvent, with from about 10 to about 35 wt % being most preferred. Optionally, one or more water-soluble surfactants/amphiphiles (0 to about 40 wt %, preferably about 0.1 to about 5 wt %) may be present. The inks of this invention have a pH in the range of from about 4 to 11, preferably from about 6 to about 10, and more preferably from about 7 to about 9. The reactive fluids of this invention have a pH in the range of from about 2.5 to about 11, preferably from about 3 to 8, more preferably from about 4 to 7.

The inkjet ink comprises a first vehicle and at least one colorant, while the fixer, or reactive, fluid comprises a second vehicle and water. In a preferred embodiment, the first vehicle and the second vehicle each comprise water and at least one water-miscible organic solvent that may be the same or different in both vehicles.

Reactive fluid choices are highly dependent upon the makeup of the colorant that is being used. For example, those colorants which use cryptands as derivitizing agents (contain nitrogen within the crown ether) and an acidic vehicle (to protonate the nitrogen sites) may interact with underprinting fluids containing salts of multivalent anionic species such as sodium sulfate ($Na_2SO_4$) or polymers of carboxylates such as the SMA-x000H series (where x=1, 2, or 3; available from Elf Atochem) or any other series of polyacrylates (molecular weights ranging from 500 to 150,000 where operability of the pen determines the upper limits of the molecular weight).

If a cationic polymer is used (polyallylamine or polyvinylamine at low pH (~4.0)), traditional crown ethers may be used on the colorant to immobilize the colorant onto the underprinted or overprinted $5^{th}$ pen fluid. Additionally, multivalent cationic salts of calcium ($Ca^{2+}$), aluminum ($Al^{3+}$), magnesium ($Mg^{2+}$) may be used to isolate and immobilize the colorant onto the media on which it was printed.

INDUSTRIAL APPLICABILITY

The crown ether derivatized colorants of the present invention are expected to find use in inkjet printing.

What is claimed is:

1. An inkjet ink comprising a vehicle and at least one colorant, wherein said at least one colorant is selected from the group consisting of water-soluble dyes, water-insoluble dyes, and pigments, wherein said colorant is derivatized with at least one crown ether.

2. The inkjet ink of claim 1, wherein the water-soluble dye derivatized with at least one crown ether is a derivative of direct blue 199

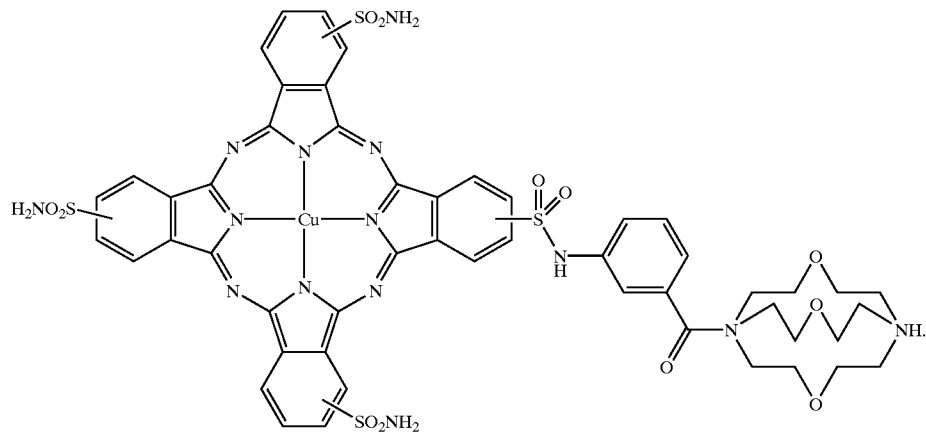

3. The inkjet ink of claim 2 wherein R is selected from the group consisting of —(C═O)R', —Cl, —Br, —$NH_2$, —OH, —$CH_2NH_2$, —$CH_2OH$, and —CH═$CH_2$, wherein Y is selected from the group consisting of phenyl and naphthyl groups, and wherein Z is selected from the group consisting of cyclohexane, cycloheptane, and cyclopentane.

4. The inkjet ink of claim 1, wherein the water-soluble dye derivatized with at least one crown ether is a derivative of reactive red 2

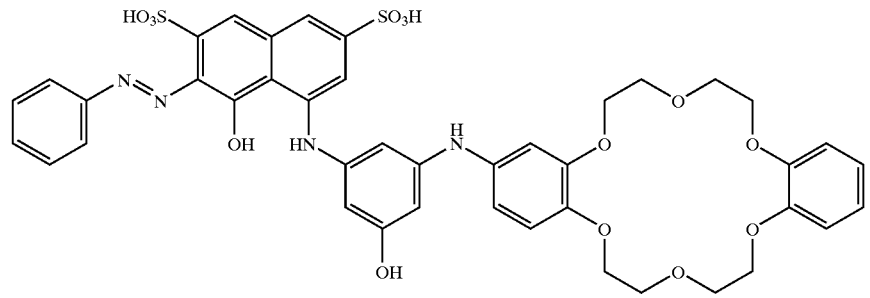

5. The inkjet ink of claim 1, wherein the water-soluble dye derivatized with at least one crown ether is a derivative of direct yellow 132 where:
X=is selected from the group consisting of O, S, NH, and NR';

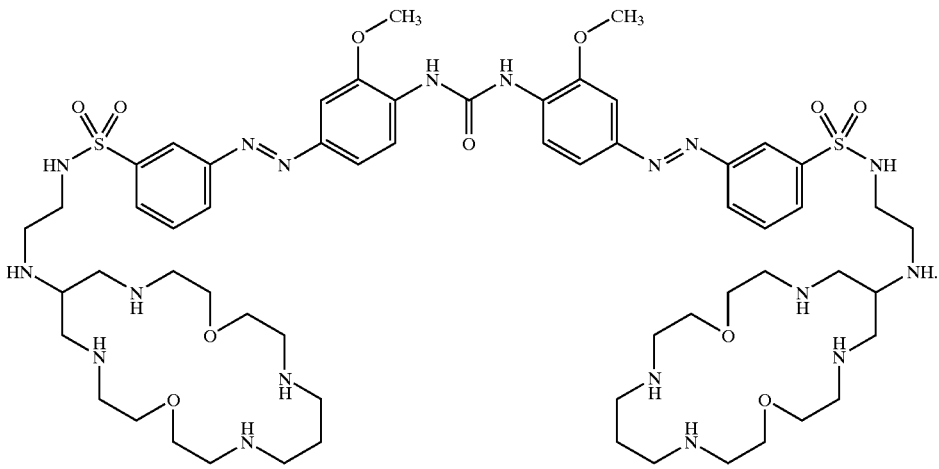

6. The inkjet ink of claim 1 wherein said at least one crown ether is selected from the group consisting of

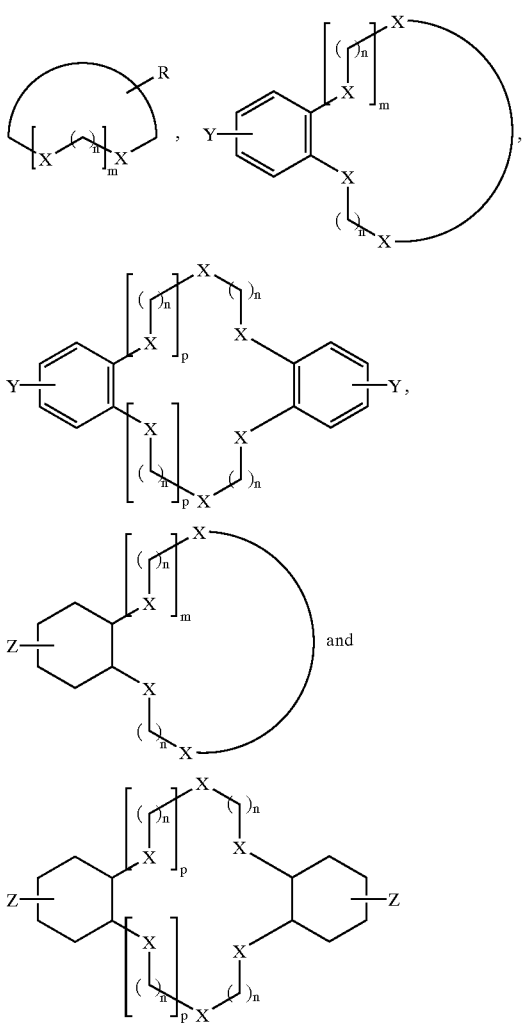

R=a reactive group through which the crown ether may be attached covalently onto the ring;
R'=an aliphatic group or aromatic group or a salt of an amine;
n=2 to 3;
m=3 to 10;
p=1 to 5;
Y=an aromatic functionality with said reactive group attached through which said crown ether may be covalently bound to the dye molecule; and
Z=a cyclic aliphatic functionality with said reactive group attached through which the crown ether may be covalently bound to the dye molecule.

7. The inkjet of claim 1 wherein said vehicle comprises water and at least one water-miscible organic solvent.

8. The inkjet ink of claim 7 wherein said at least one water-miscible organic solvent is selected from the group consisting of aliphatic alcohols, aromatic alcohols, diols, glycol ethers, poly(glycol) ethers, caprolactams, formamides, acetamides, and long chain alcohols.

9. The inkjet ink of claim 8 wherein said at least one water-miscible organic solvent is selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides.

10. The inkjet ink of claim 1 wherein said inkjet ink comprises about 1 to 10 wt % of said at least one crown ether derivatized colorant, the balance being said vehicle.

11. The inkjet ink of claim 1 further comprising at least one additive selected from the group consisting of surfactants, biocides, and pH adjusters.

12. In combination, (a) an inkjet ink comprising a first vehicle and at least one colorant, wherein said at least one colorant is selected from the group consisting of water-soluble dyes, water-insoluble dyes, and pigments, wherein said colorant is derivatized with at least one crown ether, and (b) a fixer fluid for underprinting said inkjet ink, said fixer fluid comprising a second vehicle and water.

13. The combination of claim 12 wherein said at least one crown ether is selected from the group consisting of

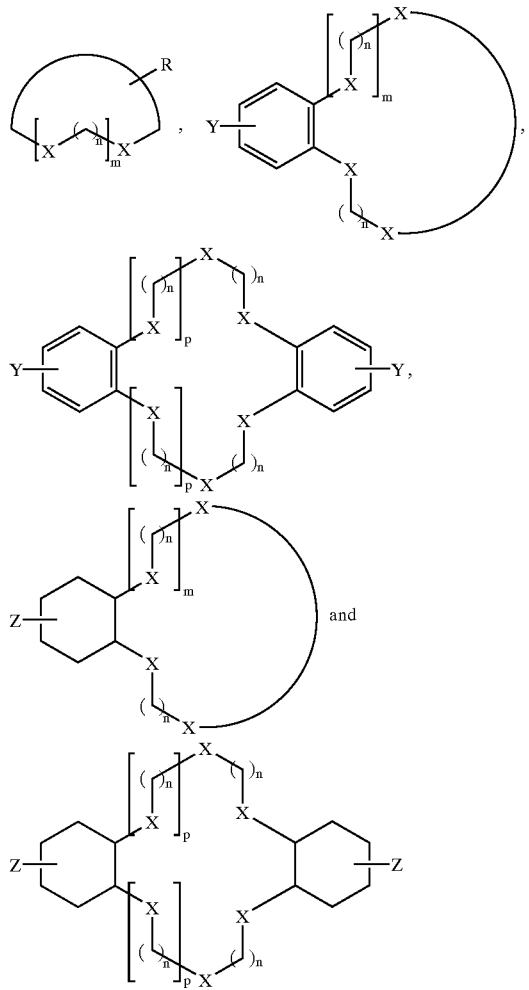

where:
X=is selected from the group consisting of O, S, NH, and NR';
R=a reactive group through which the crown ether may be attached covalently onto the ring;
R'=an aliphatic group or aromatic group or a salt of an amine;
n=2 to 3;
m=3 to 10;
p=1 to 5;
Y=an aromatic functionality with said reactive group attached through which said crown ether may be covalently bound to the dye molecule; and
Z=a cyclic aliphatic functionality with said reactive group attached through which the crown ether may be covalently bound to the dye molecule.

14. The combination of claim 13 wherein R is selected from the group consisting of —(C=O)R', —Cl, —Br, —NH$_2$, —OH, —CH$_2$NH$_2$, —CH$_2$OH, and —CH=CH$_2$, wherein Y is selected from the group consisting of phenyl and naphthyl groups, and wherein Z is selected from the group consisting of cyclohexane, cycloheptane, and cyclopentane.

15. The combination of claim 12 wherein said first vehicle and said second vehicle each comprise water and at least one water-miscible organic solvent that may be the same or different in both vehicles.

16. The combination of claim 15 wherein said at least one water-miscible organic solvent is independently selected from the group consisting of aliphatic alcohols, aromatic alcohols, diols, glycol ethers, poly(glycol) ethers, caprolactams, formamides, acetamides, and long chain alcohols.

17. The combination of claim 16 wherein said at least one water-miscible organic solvent is selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, polypropylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides.

18. The combination of claim 12 wherein said inkjet ink comprises about 1 to 10 wt % of said at least one crown ether derivatized colorant, the balance being said vehicle.

19. The combination of claim 12 wherein said inkjet ink and said fixer further independently comprise at least one additive selected from the group consisting of surfactants, biocides, and pH adjusters and wherein said fixer further comprises at least one cationic salt.

20. The combination of claim 19 wherein said cationic salts are selected from the group consisting of Ca(NO$_3$)$_2$, CaCl$_2$, Mg(NO$_3$)$_2$, LiNO$_3$, NaNO$_3$, NaCl, LiCl, KCl, KNO$_3$, MgCl$_2$, AlCl$_3$ and Al(NO$_3$)$_3$.

21. A method of rendering a water-insoluble colorant soluble in an aqueous environment, comprising:
(a) providing a water-insoluble colorant selected from the group consisting of insoluble dyes and pigments; and
(b) reacting said water-insoluble colorant with at least one crown ether.

22. The method of claim 21 wherein said at least one crown ether is selected from the group consisting of

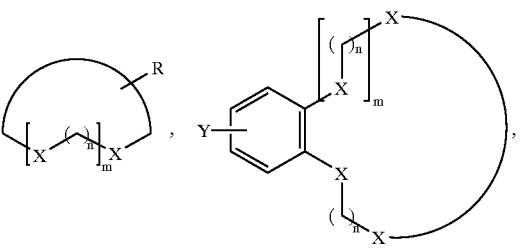

-continued

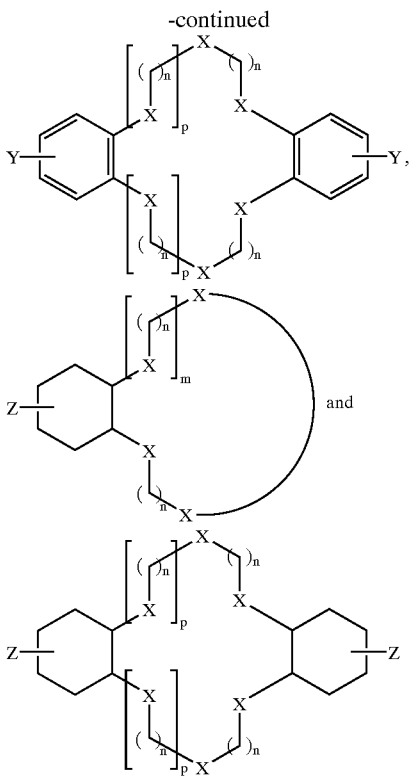

where:
X is selected from the group consisting of O, S, NH, and NR';
R=a reactive group through which the crown ether may be attached covalently onto the ring;
R'=an aliphatic group or aromatic group or a salt of an amine;
n=2 to 3;
m=3 to 10;
p=1 to 5;
Y=an aromatic functionality with said reactive group attached through which said crown ether may be covalently bound to the dye molecule; and
Z=a cyclic aliphatic functionality with said reactive group attached through which the crown ether may be covalently bound to the dye molecule.

23. The method of claim 22 wherein R is selected from the group consisting of —(C=O)R', —Cl, —Br, —NH$_2$, —OH, —CH$_2$NH$_2$, —CH$_2$OH, and —CH=CH$_2$, wherein Y is selected from the group consisting of phenyl and naphthyl groups, and wherein Z is selected from the group consisting of cyclohexane, cycloheptane, and cyclopentane.

24. The method of claim 21 wherein said crown ether contains at least one amine group selected from the group consisting of primary and secondary amines and wherein said colorant is a reactive dye that contains at least one halogen group for reacting with said primary amine or said secondary amine to form a covalently bonded molecule comprising at least one said crown ether and said colorant.

25. The method of claim 21 wherein said crown ether contains a halogen group selected from the group consisting of primary halogens and secondary halogens and wherein said colorant contains at least one amine group selected from the group consisting of primary and secondary amines for reacting with said primary halogen or said secondary halogen to form a covalently bonded molecule comprising at least one said crown ether and said colorant.

26. The method of claim 21 wherein said colorant is selected from the group consisting of totally aromatic pigments and totally aromatic dyes, wherein said at least one crown ether contains at least one halogen-containing group selected from the group consisting of halogens and acylhalides, and wherein said reacting is done in the presence of aluminum trichloride in a Friedel-Crafts alkylation reaction to form a covalently bonded molecule comprising at least one said crown ether and said colorant.

27. A method of forming an inkjet ink comprising a vehicle and at least onea water-insoluble colorant selected from the group of water-soluble dyes, water-insoluble dyes, and pigments, said vehicle comprising water and at least one water-miscible organic solvent, said method comprising:

(a) providing a said at least one water-insoluble colorant selected from the group consisting of insoluble dyes and pigments;

(b) reacting said at least one water-insoluble colorant with at least one crown ether to form a crown ether derivatized colorant that is water-soluble; and (c) adding said crown ether derivatized colorant to said vehicle to form said inkjet ink.

28. The method of claim 27 wherein said at least one water-miscible organic solvent is selected from the group consisting of aliphatic alcohols, aromatic alcohols, diols, glycol ethers, poly(glycol) ethers, caprolactams, formamides, acetamides, and long chain alcohols.

29. The method of claim 27 wherein said at least one water-miscible organic solvent is selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides.

30. The method of claim 29 wherein said at least one water-miscible organic solvent is selected from the group consisting of N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols.

31. The method of claim 27 wherein said inkjet ink comprises about 1 to 10 wt % of said at least one crown ether derivatized colorant, the balance being said vehicle.

32. The method of claim 27 further comprising at least one additive selected from the group consisting of surfactants, biocides, and pH adjusters.

33. The method of claim 27 wherein said at least one crown ether is selected from the group consisting of

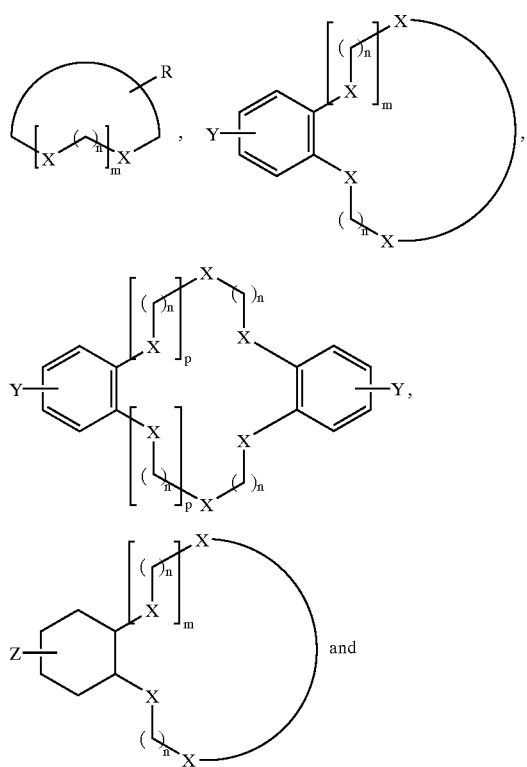

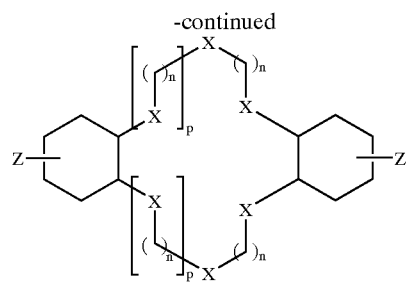

where:
X = is selected from the group consisting of O, S, NH, and NR';
R = a reactive group through which the crown ether may be attached covalently onto the ring;
R' = an aliphatic group or aromatic group or a salt of an amine;
n = 2 to 3;
m−3 to 10;
p = 1 to 5;
Y = an aromatic functionality with said reactive group attached through which said crown ether may be covalently bound to the dye molecule; and
Z = a cyclic aliphatic functionality with said reactive group attached through which the crown ether may be covalently bound to the dye molecule.

34. The method of claim 33 wherein R is selected from the group consisting of —(C=O)R', —Cl, —Br, —$NH_2$, —OH, —$CH_2NH_2$, —$CH_2OH$, and —CH=$CH_2$, wherein Y is selected from the group consisting of phenyl and naphthyl groups, and wherein Z is selected from the group consisting of cyclohexane, cycloheptane, and cyclopentane.

* * * * *